United States Patent [19]

Prozeller et al.

[11] Patent Number: 4,971,182

[45] Date of Patent: Nov. 20, 1990

[54] DOUBLE-TUBE OSCILLATION DAMPER

[75] Inventors: Ernst Prozeller, Schweinfurt; Günther Handke, Euerbach; Peter Prozeller, Schweinfurt; Peter Ullmer, Bergrheinfeld, all of Fed. Rep. of Germany

[73] Assignee: Fichtel & Sachs AG, Schweinfurt, Fed. Rep. of Germany

[21] Appl. No.: 492,599

[22] Filed: Mar. 12, 1990

[30] Foreign Application Priority Data

Mar. 15, 1989 [DE] Fed. Rep. of Germany ....... 3908349

[51] Int. Cl.⁵ ............................ F16F 9/18; F16F 9/34; F16F 9/36; B60G 13/06
[52] U.S. Cl. .................................. 188/322.17; 188/318
[58] Field of Search ..................... 188/322.17, 318, 315, 188/322.19, 316, 317, 313, 314, 322.15, 298; 92/168, 165

[56] References Cited

U.S. PATENT DOCUMENTS

| 4,055,352 | 10/1977 | Allinquant et al. | 188/322.17 X |
|---|---|---|---|
| 4,189,033 | 2/1980 | Katsumori | 188/322.17 X |
| 4,445,598 | 5/1984 | Brambilla | 188/322.17 X |
| 4,482,036 | 11/1984 | Wössner et al. | 188/322.17 X |
| 4,494,632 | 1/1985 | De Baan et al. | 188/322.17 X |
| 4,508,020 | 4/1985 | Szcupak | 188/322.17 X |
| 4,542,811 | 9/1985 | Miura | 188/322.17 |
| 4,821,850 | 4/1989 | Geiling et al. | 188/315 |

FOREIGN PATENT DOCUMENTS

| 2808481 | 9/1979 | Fed. Rep. of Germany. | |
|---|---|---|---|
| 3613154 | 10/1987 | Fed. Rep. of Germany | 188/322.17 |
| 3708978 | 9/1988 | Fed. Rep. of Germany | 188/322.17 |

Primary Examiner—Douglas C. Butler
Attorney, Agent, or Firm—Brumbaugh, Graves, Donohue & Raymond

[57] ABSTRACT

In a double-tube oscillation damper a pressure relief valve is provided adjacent a piston rod guiding and sealing device between a leakage gas collecting chamber and an annular space confined between the cylinder and a container surrounding the cylinder. This pressure relief valve comprises an elastic annular membrane which is supported in radial and axial direction by a support ring. This support ring has a sleeve portion providing a circumferential, substantially radially directed support face for the elastic annular membrane and an annular bottom disc for fastening the support ring with respect to the piston rod guiding and sealing device. A radially outwardly directed lip is provided in the transition area between the sleeve and the bottom disc. This lip is integral with the sleeve and the bottom disc.

14 Claims, 3 Drawing Sheets

DOUBLE-TUBE OSCILLATION DAMPER

BACKGROUND OF THE INVENTION

In a double-tube oscillation damper, the working chambers within the cylinder contain a damping liquid. The annular space between the cylinder and an external container contains both a liquid and a body of gas. The body of gas may be under superatmospheric pressure. A bottom valve unit is provided between the lower working chamber within the cylinder and the body of liquid within the annular space. The liquid within the cylinder should be free of gas and more particularly air enclosures. However, air can enter into the working chambers, e.g. through the bottom valve unit. This air can escape from the upper working chamber through the piston rod guiding and sealing unit. It is desirable to return this air through the piston rod guiding and sealing unit into the annular space. Therefore, a pressure relief valve is provided between a leakage gas collecting means adjacent the piston rod guiding and sealing unit and the annular space confined between the cylinder and the container.

STATEMENT OF THE PRIOR ART

DE-OS No. 2 808 481 shows an air-vent valve which is arranged adjacent the piston rod guiding and sealing unit and allows a gas flow or more particularly an air flow from the upper working chamber towards the annular space. A passage provided in the piston rod guiding and sealing unit is pressure-dependently opened by an elastic annular membrane. The piston rod guiding and sealing unit serves as a carrier for the elastic annular membrane. A groove is provided in the piston rod guiding and sealing unit for axially and radially supporting the annular elastic membrane. For providing the supporting surfaces on the piston rod guiding and sealing unit, which are to support the elastic annular membrane both in radial and axial direction, the sintered basic body of the piston rod guiding and sealing unit must be subjected to a considerable amount of swarf removing machining, since the undercuttings necessary for obtaining the support surfaces cannot be produced by the sintering method.

OBJECT OF THE INVENTION

It is the object of the present invention to provide a pressure relief valve adjacent the piston rod guiding and sealing unit with reduced machining of the basic body of the piston rod guiding and sealing unit so that the double-tube oscillation damper can be manufactured in a more economic way than up to now. The manufacturing and assembling of the double-tube oscillation damper should be facilitated.

SUMMARY OF THE INVENTION

A double-tube oscillation damper comprises a container member having an axis and two ends and a cylinder member coaxially arranged within said container member. The cylinder member has also two ends adjacent respective ends of the container member. A piston rod guiding and sealing unit is provided adjacent respective first ends of the cylinder member and the container member. A bottom valve unit is provided adjacent respective second ends of the container member and the cylinder member. A cavity is confined within the cylinder member. A piston rod member is sealingly guided by the guiding and sealing unit inwards and outwards of the cavity. This piston rod member is provided with a piston unit within the cavity. The piston unit divides the cavity into a first working chamber adjacent the guiding and sealing unit and a second working chamber adjacent the bottom valve unit. These working chambers are interconnected across the piston unit through piston valve means. The working chambers contain a damping liquid. An annular space is confined between the cylinder member and the container member. This annular space contains a body of damping liquid and a body of gas. The body of damping liquid is connected with the second working chamber through the bottom valve unit. The piston rod guiding and sealing unit is provided with leakage gas collecting means and further provided with pressure relief valve means connecting said leakage gas collecting means with the annular space, such as to allow gas to flow from said leakage gas collecting means towards said annular space. The pressure relief valve means comprise an elastic annular membrane radially supported by radially outwardly directed support face means and axially supported by axial support means. The radially outwardly directed support face means comprise a circumferential support face of the piston rod guiding and sealing unit and—axially adjacent said circumferential support face of said guiding and sealing unit towards said second ends—a further circumferential support face of an annular support member fastened to said piston rod sealing and guiding unit. The annular support member has—when regarded in a plane of section containing said axis—a substantially rectangular cross-section with a bottom disc section corresponding to a bottom disc and a sleeve section corresponding to a sleeve. This sleeve provides said further circumferential support face. A radially outwardly directed projection extends radially outwards from said sleeve. This projection forms at least part of said axial support means. The bottom disc, the sleeve and the projection are integrally coherent.

The manufacturing of the annular support member is very simple. The basic body of the piston rod guiding and sealing unit can be manufactured without undercuttings. This basic body can be sintered or cast with a simple tool. The final shape of the basic body of the piston rod guiding and sealing unit can be obtained without swarf removing machining. Assembling of the piston rod guiding and sealing unit and the pressure relief valve is facilitated.

The invention is particularly applicable, if a superatmospheric pressure is to be maintained within the annular space confined between the cylinder member and the container member. In such case, it is necessary to return the gas or air escaping from the second working chamber into the annular space in order to maintain the required superatmospheric pressure within the annular space.

In order to provide a perfect axial support for the elastic annular membrane, the projection may be formed as an annular lip.

This annular lip may be provided adjacent a transition area between the bottom disc and the sleeve.

According to one embodiment of the invention, the bottom disc, the sleeve and the projection may be integrally shaped from sheet metal. This sheet metal may e.g. have a wall thickness of 0.5 mm. With such a wall thickness, the shaping of the annular support member may be easily performed in accordance with usual stamping and bending methods. So, the annular lip may be shaped as a fold of the sheet metal.

According to another embodiment of the invention, the annular support member may be moulded of plastic material and preferably of fibre-reinforced synthetic plastic material.

The sleeve of the annular support body may be centered on a circumferential centering surface of the piston rod guiding and sealing unit. This centering surface may be established by a plurality of centering noses. The existence of these centering noses allows the use of a plurality of bores through the piston rod guiding and sealing unit, which bores have respective exit openings towards the annular space. These exit openings can be located circumferentially between subsequent centering noses such that the exit openings are not closed by the sleeve resting on the centering noses.

The bottom disc should be in sealing engagement with the piston rod guiding and sealing unit, such as to define a valve exit chamber closed by the annular membrane. The annular membrane is liftable from at least one of said circumferential support faces and said circumferential support face, such as to allow return flow of gas and particularly air towards the annular space.

The bottom disc may have a radially inner edge engaging a circumferential engagement face of the piston rod guiding and sealing unit. The engagement of this inner edge with said circumferential engagement face may provide a preassembling possibility of said annular support member with respect to said piston rod guiding and sealing unit during the assembling of the double-tube oscillation damper. This is an alternative for the preassembling possibility which exists, when the sleeve is engaged with centering noses of the piston rod guiding and sealing unit. It is possible to combine both possibilities, i.e. to provide an engagement of centering noses and the sleeve and to provide additionally engagement between the radially inner edge of the bottom disc and a circumferential engagement face of the piston rod guiding and sealing unit.

In practice, the cylinder member is frequently centered on the piston rod guiding and sealing unit by a circumferential engagement face of the piston rod guiding and sealing unit engaging a radially inner surface of the cylinder member. This conventional centering of the cylinder member can be used according to the present invention for fixing the support member with respect to the piston rod guiding and sealing unit. It is only necessary that the first end of the cylinder member axially engages the bottom disc of the annular support member on one side thereof, whereas the other side of the bottom disc is axially supported by an axially directed support face of the piston rod guiding and sealing unit. When the cylinder member is axially compressed between the bottom valve unit and the piston rod guiding and sealing unit, this axial engagement of the first end of the cylinder member with the bottom disc provides a perfect and substantially tight closure for the valve exit chamber defined by the annular support member and the piston rod guiding and sealing unit.

If it is desirable to provide a preassembling engagement between the radially inner edge of the bottom disc and the piston rod guiding and sealing unit, the circumferential engagement face for the cylinder member may have a narrow zone of increased diameter adjacent the axially directed support face such that this zone of increased diameter may be engaged by the radially inner edge of said bottom disc.

The various features of the invention are discussed especially in the accompanying claims which form a part of the disclosure. For the better understanding of the invention, its working advantages and specific effects reference is now made to the accompanying drawings and the description, in which a preferred form of embodiment of the invention is discussed.

BRIEF DESCRIPTION OF THE DRAWINGS

The invention is represented in the accompanying drawings and will be described in greater detail below. In the drawings

DETAILED DESCRIPTION OF THE PREFERRED EMBODIMENTS

Figure 1:
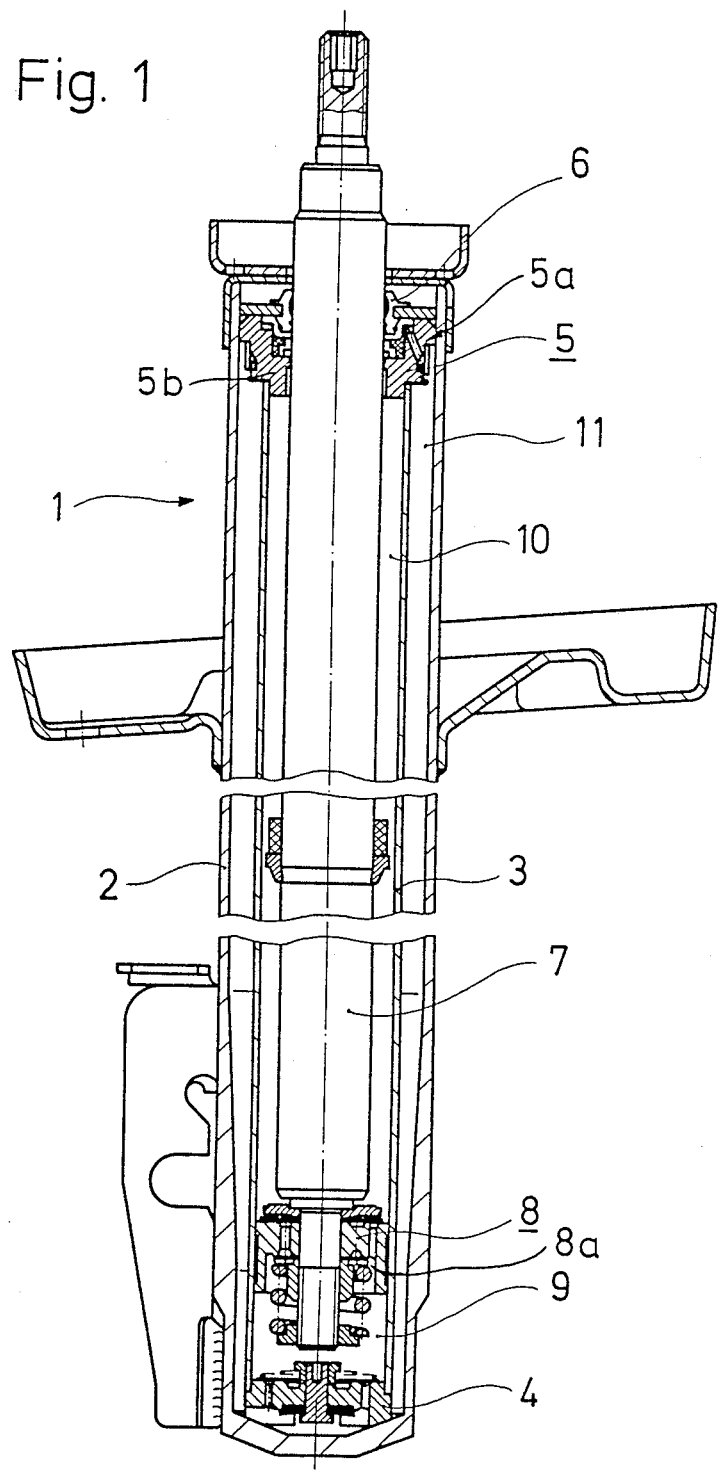
FIG. 1 shows a double-tube oscillation damper of the present invention in a longitudinal section.

FIG. 1 shows a combination of a double-tube oscillation damper and a spring unit for a motor vehicle. The double-tube oscillation damper comprises a container 2 in which a cylinder 3 is made fast coaxially by means of a bottom valve unit 4 and a piston rod guiding and sealing unit 5. A piston rod 7 is guided by the unit 5 and sealed off to the exterior by means of a piston rod seal 6. A piston unit 8 is connected with the piston rod 7 and provided with damping valves 8a. This piston unit 8 divides the interior space of the cylinder 3 into the lower working chamber 9 and the upper working chamber 10, both filled with a damping liquid. The lower working chamber 9 is in communication through the bottom valve unit 4 with an annular space 11 formed between the outer surface of the cylinder 3 and the inner surface of the container 2. The lower part of the annular space 11 is filled with the damping liquid, whereas the upper part of the annular space 11 contains a volume of pressurized gas or air. The upper working chamber 10 is in communication, through the piston rod guiding and sealing unit 5 and a pressure relief valve 5a connected therewith, with the annular space 11. The pressure of the air or gas contained within the annular space 11 is about 10 bars. The advantages of such gas pressure dampers consist in the exact damping and the low noise level which provide a high driving comfort.

In the case of such a double-tube oscillation damper, the gas and the fluid in the annular space 11 are not separated from one another by a partition. Accordingly, precautions must be taken to return any gas, which may have been sucked out of the annular space 11 into the working chambers 9 and 10, through the piston rod guiding and sealing unit 5 back into the annular space 11. For this purpose there serves the air-vent valve or pressure relief valve 5a allocated to the piston rod guiding and sealing unit 5.

Figure 2:
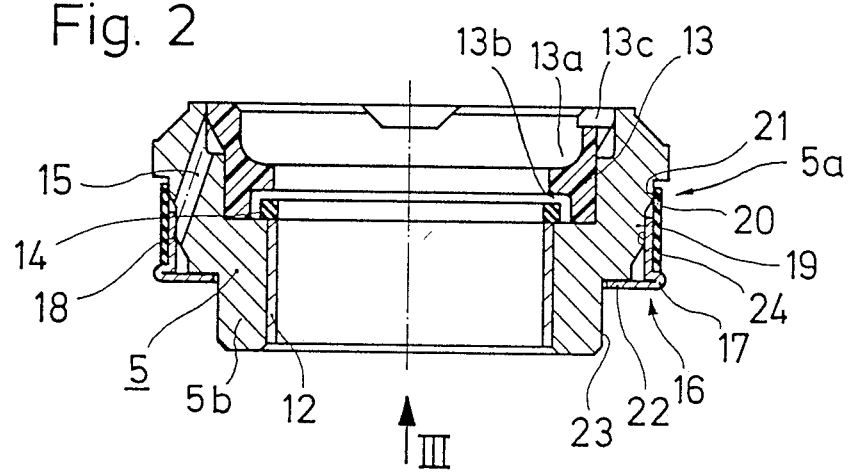
FIG. 2 shows details of the piston rod guiding and sealing unit in an enlarged representation.

This pressure relief valve 5a is shown in enlarged representation in FIG. 2. In the basic body 5b of the piston rod guiding and sealing unit 5, which basic body 5b is produced e.g. as a sintered or cast part, a guide bush 12 is impressed, in which the piston rod 7, as represented in FIG. 1, slides. The damping liquid adhering to the piston rod 7 is scraped off by means of the oil scraper ring 14, which is axially movably arranged in a stop bush 13 between two stops. The stop bush 13 is impressed into the basic body 5b of the piston rod guiding and sealing unit 5. An upper chamber 13a, limited substantially by the stop bush 13, is connectable with the pressure relief valve 5a by several bores 15 forming a valve passage. The pressure relief valve 5a comprises a support ring 16 which comprises a sleeve 18, an external lip 17, and a bottom disc 22. On the sleeve 18 there is provided an elastic, cylindrical membrane 20, which is made longer than the sleeve 18 and cooperates with a circumferential support face 21 of the piston rod guiding and sealing unit 5. The sleeve 18 provides a further circumferential support face 18a for the membrane 20. For the fitting of the support ring 16 on the piston rod guiding and sealing unit 5 the basic member 5b is provided with a plurality of centering noses 19 arranged in uniform distribution over the circumference, onto which the support ring 16 is pushed with the inner face 24 of the sleeve 18. The membrane 20 may be applied to the piston rod guiding and sealing unit 5 after the support ring 16 has been mounted on the noses 19. It is, however, also possible to assemble the membrane 20 with a support ring 16, before the support ring 16 is mounted on the centering noses 19. In such case, the chamfered circumferential faces of the basic body 5b assist the mounting of the support ring 16 and the membrane 20 onto the basic body 5b. In each case, the piston rod guiding and sealing unit 5 as represented in FIG. 2 constitutes a preassembled unit which is hereafter installed in the assembly of the double-tube oscillation damper. The cylinder 3 is guided by means of the circumferential engagement face 23 and is pressed by its upper end against the bottom disc 22 so that the support ring 16 is pressed in firmly between the cylinder 2 and the piston rod guiding and sealing unit 5.

Figure 3:
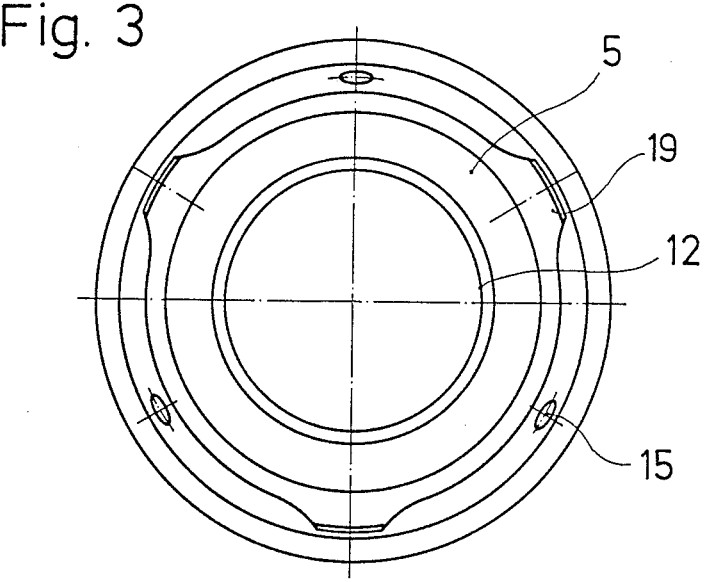
FIG. 3 shows an end view of the piston rod guiding and sealing unit, without the annular support member as seen in a direction III of FIG. 2.
Figure 4:
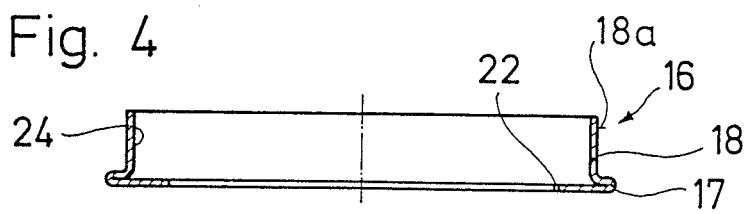
FIG. 4 shows the annular support ring of FIG. 2.

Correspondingly, the connection of the support ring 16 with the piston rod guiding and sealing unit 5 by means of the centering noses 19 and the inner face 24 serves only as security against loss, which must act until the assembly with the other oscillation damper parts takes place. FIG. 3 shows the arrangement of the centering noses 19 in relation to the bores 15 in the piston rod guiding and sealing unit 5. The support ring 16, formed as a sheet metal part, is represented in FIG. 4 as an individual part. FIG. 4 shows the integral coherence of the sleeve 18, the bottom disc 22 and the fold 17, the sheet metal having a wall thickness of about 0.5 mm. With the inner face 24 this support ring 16 is centered and preassembled on the centering noses 19 of the piston rod guiding and sealing unit 5.

The manner of operation of the pressure relief valve 5a will be described by reference to FIGS. 1 and 2. The piston rod seal 6 extends into the upper chamber 13a, limited by the stop bush 13, of the piston rod guiding and sealing unit 5. This chamber 13a is in communication by the bores 15 with the annular space 11. This communication can be shut off by an elastic, cylindrical valve part 20. Especially in the traction stroke, when the piston rod 7 is moved upwards in FIG. 1, the oil scraper ring 14 lays itself against the end face of the stop bush 13 and permits a passage to the chamber 13a, by way of a notch 13b machined in this end face and by way of a further notch 13c. As soon as the pressure in the chamber 13a is greater than that in the annular space 11, the membrane 20 lifts away from the circumferential support face 21 and renders possible flow into the annular space 11.

Figure 5:
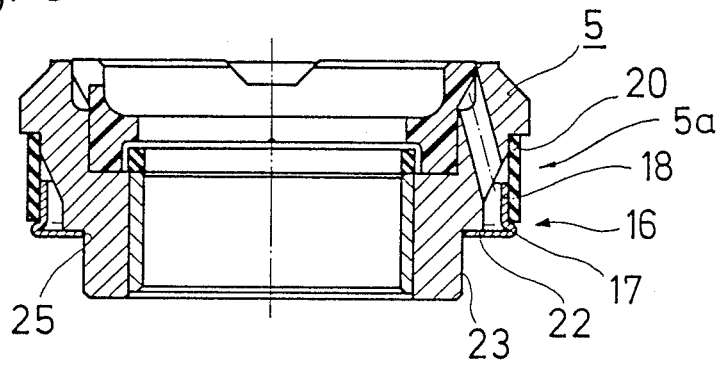
FIG. 5 shows an alternative embodiment of the piston rod guiding and sealing unit.
Figure 6:
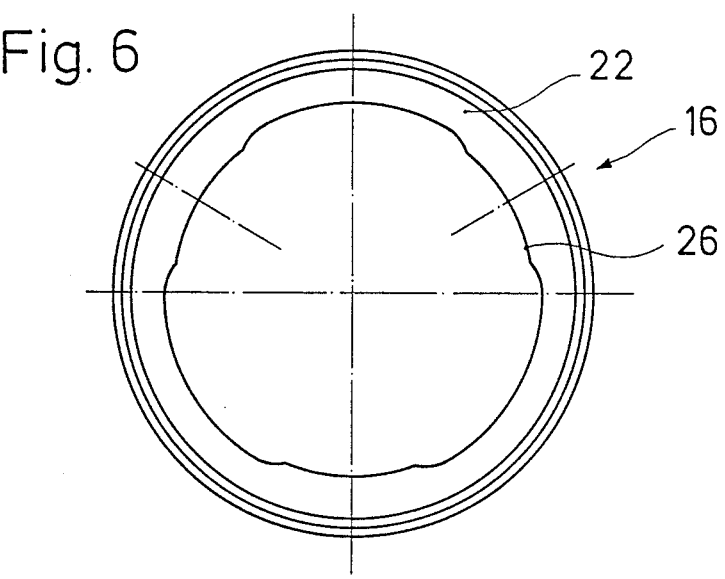
FIG. 6 shows a plan view of the annular support member of FIG. 5.

FIGS. 5 and 6 show a further embodiment of the pressure relief valve 5a allocated to the piston rod guiding and sealing unit 5. Here again a support ring 1 is produced from a sheet metal and comprises an external lip 17, a sleeve 18 and a bottom disc 22. The fastening of this support ring 16 is effected by a press-on collar 25 defined by a slightly increased diameter of the circumferential engagement face 23 adjacent the upper end of this engagement face. Thus the object is achieved that in the pressing-on of the support ring 16 in the region of the internal diameter of the bottom disc 22, no swarf formation occurs, for the internal diameter of the bottom disc 22 slides easily over the length of the circumferential engagement face 23, and only the press-on collar 25 effects a press fit. In the case of this embodiment again the sleeve 18 is made shorter in the axial direction than the elastic membrane 20, so that the manner of working is in accordance with that described with reference to FIGS. 1 to 4. The inner engagement edge of the bottom disc 22 is designated by 26 in FIG. 6.

Specific forms of embodiment of the invention have been represented and described in order to illustrate the use of the principles of the invention. Of course, the invention can also be realized in other ways without departing from these principles.

The reference numbers in the claims serve only for facilitation of understanding and are not to be understood as a limitation.

We claim:

1. A double-tube oscillation damper comprising a container member (2) having an axis and two ends and a cylinder member (3) coaxially arranged within said container member (2), said cylinder member (3) having also two ends adjacent respective ends of said container member (2), a piston rod guiding and sealing unit (5) being provided adjacent respective first ends of said cylinder member (3) and said container member (2), a bottom valve unit (4) being provided adjacent respective second ends of said container member (2) and said cylinder member (3), a cavity (9,10) being confined within said cylinder member (3), a piston rod member (7) being sealingly guided by said guiding and sealing unit (5) inwards and outwards of said cavity (9,10), said piston rod member (7) being provided with a piston unit (8) within said cavity (9,10), said piston unit (8) dividing said cavity (9,10) into a first working chamber (10) adjacent said guiding and sealing unit (5) and a second working chamber (9) adjacent said bottom valve unit (4), said working chambers (9,10) being interconnected across said piston unit (8) through piston valve means (8a), said working chambers (9,10) containing a damping liquid, an annular space (11) being confined between said cylinder member (3) and said container member (2), said annular space (11) containing a body of damping liquid and a body of gas, said body of damping liquid being connected with said second working chamber (9) through said bottom valve unit (4), said piston rod guiding and sealing unit (5) being provided with leakage gas collecting means (13a), said piston rod guiding and sealing unit (5) being further provided with pressure relief valve means (5a) connecting said leakage gas collecting means (13a) with said annular space (11), such as to allow gas to flow from said leakage collecting means (13a) towards said annular space (11), said pressure relief valve means (5a) comprising an elastic annular membrane (20) radially supported by radially outwardly directed support face means (21,18a) and axially supported by axial support means (17), characterized by said radially outwardly directed support face means (21,18a) comprising a circumferential support face (21) of said piston rod guiding and sealing unit (5) and—axially adjacent said circumferential support face (21) of said guiding and sealing unit (5) towards said second ends—a further circumferential support face (18a) of an annular support member (16) fastened to at least one of said piston rod sealing and guiding unit (5) and said cylinder member (3), said annular support member (16) having—when regarded in a plane of section containing said axis—a substantially rectangular cross-section with a bottom disc section corresponding to a bottom disc (22) and a sleeve section corresponding to a sleeve (18), said sleeve (18) providing said further circumferential support face (18a), a radially outwardly directed projection (17) extending radially outwards from said sleeve (18), said projection (17) forming at least part of said axial support means, said bottom disc (22), said sleeve (18) and said projection (17) being integrally coherent.

2. A double-tube oscillation damper as set forth in claim 1, said projection (17) being an annular lip.

3. A double-tube oscillation damper as set forth in claim 2, said annular lip (17) being provided adjacent a transition area between said bottom disc (22) and said sleeve (18).

4. A double-tube oscillation damper as set forth in claim 1, said bottom disc (22), said sleeve (18) and said projection (17) being integrally shaped from sheet metal.

5. A double-tube oscillation damper as set forth in claim 4, said projection (17) being an annular lip, said annular lip (17) being a fold of said sheet metal.

6. A double-tube oscillation damper as set forth in claim 1, said annular support member (16) being moulded of synthetic plastic material.

7. A double-tube oscillation damper as set forth in claim 6, said annular support member (16) being moulded of fibre-reinforced synthetic plastic material.

8. A double-tube oscillation damper as set forth in claim 1, said sleeve (18) being centered on a circumferential centering surface (19) of said piston rod guiding and sealing unit (5).

9. A double-tube oscillation damper as set forth in claim 8, said circumferential centering surface being defined by a plurality of centering noses (19).

10. A double-tube oscillation damper as set forth in claim 9, said pressure relief valve means (5a) comprising a plurality of bores (15) having respective exit openings towards said annular space (11), said exit openings being located circumferentially between subsequent centering noses (19).

11. A double-tube oscillation damper as set forth in claim 1, said bottom disc (22) being in sealing engagement with at least one of said piston rod guiding and sealing unit (5) and said cylinder member (3), such as to define a valve exit chamber, said valve exit chamber being closed by said annular membrane (20), said membrane (20) being liftable from at least one of said circumferential support face (21) and said further circumferential support face (18a).

12. A double-tube oscillation damper as set forth in claim 1, said bottom disc (22) having a radially inner edge engaging a circumferential engagement face (23) of said piston rod guiding and sealing unit (5).

13. A double-tube oscillation damper as set forth in claim 1, said cylinder member (3) being centered on said piston rod guiding and sealing unit (5) by a circumferential engagement face (23) of said piston rod guiding and sealing unit (5), said first end of said cylinder member (3) axially engaging said bottom disc (22) on one side thereof, the other side of said bottom disc (22) being axially supported by an axially directed support face of said piston rod guiding and sealing unit (5).

14. A double-tube oscillation damper as set forth in claim 13, said circumferential engagement face (23) having a zone (25) of increased diameter adjacent said axial support face, said bottom disc (22) being in radial engagement with said circumferential engagement face (23) along said zone (25) of increased diameter.

* * * * *